United States Patent

Ueda

[11] Patent Number: 6,122,582
[45] Date of Patent: Sep. 19, 2000

[54] CONTROL DEVICE FOR AUTOMATIC TRANSMISSION

[75] Inventor: Yoshiaki Ueda, Fuji, Japan

[73] Assignee: Jatco Corporation, Japan

[21] Appl. No.: 08/931,198

[22] Filed: Sep. 16, 1997

[30] Foreign Application Priority Data

Sep. 19, 1996 [JP] Japan ................................. 8-269249

[51] Int. Cl.$^7$ .............................. G06G 7/70; B60K 41/08
[52] U.S. Cl. .............................. 701/51; 477/34; 477/156; 477/116; 477/117; 477/158; 477/163; 477/97; 701/53
[58] Field of Search .......................... 701/51, 53; 477/34, 477/156, 116, 117, 158, 163, 97

[56] References Cited

U.S. PATENT DOCUMENTS

| | | | | |
|---|---|---|---|---|
| 4,831,896 | 5/1989 | Sakakiyama | ............................... | 74/856 |
| 5,405,183 | 4/1995 | Aizawa et al. | ........................... | 303/156 |
| 5,612,874 | 3/1997 | Schulz et al. | .............................. | 701/51 |
| 5,769,753 | 6/1998 | Kusafuka et al. | ....................... | 477/116 |
| 5,801,499 | 9/1998 | Tsuzuki et al. | .......................... | 318/141 |
| 5,873,803 | 2/1999 | Geon | ....................................... | 477/158 |

*Primary Examiner*—William A. Cuchlinski, Jr.
*Assistant Examiner*—Olga Hernandez
*Attorney, Agent, or Firm*—Rossi and Associates

[57] ABSTRACT

In a control device for an automatic transmission which holds a line pressure solenoid of an automatic transmission in a stationary ON state while an engine is in a stop state, when a key switch is switched ON, "stationary ON control device" supplies a high voltage to the line pressure solenoid for a short time so as to over-excite it, and a holding magnetization of the line pressure solenoid is then maintained by a low voltage. Subsequently, if it is determined by engine rotation speed detection device that a cell motor is being driven, ordinary control is performed wherein an over-excitation, holding magnetization and OFF cycle is repeated. Further, when a battery voltage drops while the cell motor is being driven so that the line pressure solenoid with holding magnetization switches OFF, recovery device rapidly restores the solenoid to the normal stationary ON state by performing intermittent over-excitation.

10 Claims, 10 Drawing Sheets

CONTROL DEVICE FOR AUTOMATIC TRANSMISSION

BACKGROUND OF THE INVENTION

1. Field of the Invention

The present invention relates to a control device for an automatic transmission, and more particularly to a technique for controlling a line pressure solenoid of an automatic transmission in a stage from engine start up to vehicle running.

2. Description of the Prior Art

The line pressure of an automatic transmission while a vehicle is running is adjusted according to the vehicle speed or throttle opening by an automatic transmission controller. The line pressure increases when the throttle opening increases.

The automatic transmission controller increases or decreases an ON/OFF duty ratio of a line pressure solenoid so as to adjust the line pressure. Specifically, an over-excitation, holding magnetization and OFF cycle is repeated with a fixed period, and the relative proportions of ON and OFF time are preset by a predetermined control amount so as to guide the line pressure to a target value.

As the line pressure is not needed when the vehicle stops and the engine stops, the automatic transmission controller maintains the holding magnetization of the line pressure solenoid so as to stop ON/OFF operation and prevent the solenoid from emitting noise. The line pressure solenoid is then in a stationary ON state wherein a control for running condition of the vehicle (ordinary control, duty ratio control) is disengaged, and the line pressure falls to its lowest level.

Japanese Patent Laid-open Publication No. 3-9169 discloses a form of control wherein, actuation of the line pressure solenoid is stopped under conditions where the line pressure is no longer required in the automatic transmission, so that wear of the line pressure solenoid and noise from the same are suppressed. In this case, the line pressure solenoid is placed in a stationary OFF state.

When over-excitation of duty ratio-controlled line pressure solenoid is continued, a large current flows and the coil lifetime decreases. Therefore when the line pressure solenoid is brought into a stationary ON state, a high over-excitation voltage is applied for a very short time after the key switch is switched ON so as to switch the solenoid ON, and the solenoid is subsequently maintained in the ON state at a low holding magnetization voltage.

However, when the engine is started in this stationary ON state, the battery voltage temporarily decreases due to a large current taken by the cell motor. The drive voltage of the line pressure solenoid may then also fall so that the solenoid switches OFF.

Although the low holding magnetization voltage is sufficient to keep the solenoid ON in opposition to the counterforce of a return spring in the solenoid, but it is not sufficient to compress the spring and bring the solenoid back to ON position from its OFF position.

Consequently when the cell motor drive stops, even if the battery voltage is restored and the drive voltage of the line pressure solenoid is restored to its normal level of holding magnetization, the line pressure solenoid does not return to its normal ON state and remains OFF.

It has been proposed to detect the battery voltage and to apply intermittent over-excitation for a period in which the battery voltage is lower than a predetermined value, so as to restore the line pressure solenoid from OFF to ON state. In this case however, it is necessary to provide a circuit for detecting battery voltage in the automatic transmission controller.

SUMMARY OF THE INVENTION

It is therefore an object of the present invention to provide a control device for an automatic transmission wherein the line pressure solenoid is restored to the ON state after it has switched to the OFF state due to a voltage drop without detecting the battery voltage.

To accomplish the above object there is provided according to one aspect of the present invention a control device for an automatic transmission, wherein a line pressure solenoid of an automatic transmission is held in a stationary ON state when an engine is in a stop state, and comprising stationary ON control means for maintaining the holding magnetization state of the line pressure solenoid after performing over-excitation when an engine stop state is detected, engine rotation speed detecting means for detecting that the engine rotation speed is within a range corresponding to the driving of a cell motor, and recovery means for performing over-excitation of the line pressure solenoid one or more times after the drive of the cell motor has been detected.

In this control device, the line pressure solenoid is placed in stationary ON state when the key switch is switched ON. When the cell motor is driven so as to start the engine, the engine rotation speed increases from 0, but the engine rotation speed remains in a range lower than the idle rotation speed until engine startup is complete.

While it is detected that the engine rotation speed lies within a specified range which is specific to the cell motor drive, over-excitation of the line pressure solenoid is performed.

Even when the battery voltage falls during cell motor drive and the line pressure solenoid switches OFF although unintended by the driver, over-excitation is performed to restore the solenoid to the ON state. Leaving the solenoid in the OFF state is therefore avoided.

Further, the time when the battery voltage drops is determined based on the engine rotation speed, so there is no need to provide a circuit, input terminals or program for detecting battery voltage.

According to another aspect of the present invention there is provided a control device for an automatic transmission, wherein a line pressure solenoid of an automatic transmission is held in a stationary ON state when an engine is in a stop state, and comprising stationary ON control means for maintaining the holding magnetization state of the line pressure solenoid after performing over-excitation when an engine stop state is detected, cell motor ON detecting means for detecting that a key switch is in a cell motor drive position, and recovery means for performing over-excitation of the line pressure solenoid one or more times after the drive of the cell motor has been detected.

In this control device, the line pressure solenoid is placed in stationary ON state when the key switch is switched ON. Herein, when the key switch is set to the cell motor drive position, the cell motor is driven and the engine starts.

While it is detected that the key switch is in the cell motor drive position, over-excitation of the line pressure solenoid is performed. The line pressure solenoid which has switched OFF although unintended by the driver due to a drop of battery voltage, is restored to the ON state by over-excitation. As the drop of battery voltage is determined by the position of the key switch, there is no need to provide a special circuit or program as in the aforesaid case.

In the control device for an automatic transmission according to the above one aspect or another aspect of the present invention, the recovery means may continue the intermittent over-excitation until a predetermined time has elapsed after the detected cell motor drive has ceased, in another word, after when the cell motor drive is no longer detected.

Since it is not certain that the battery voltage will immediately restore its normal value even when cell motor drive is no longer detected, intermittent over-excitation is continued until a predetermined time has elapsed to allow time for recovery. The ON state of the line pressure solenoid is therefore restored without fail by over-excitation with the battery voltage which has been restored to a predetermined voltage level, and the ON state of the line pressure solenoid is maintained by holding magnetization.

According to still another aspect of the present invention there is provided a control device for an automatic transmission, wherein a line pressure solenoid of an automatic transmission is held in a stationary ON state when an engine is in a stop state, and wherein when an engine stop state is detected a holding magnetization state of a line pressure solenoid is maintained together with intermittent over-excitation until a vehicle has reached a starting state to realize the stationary ON state.

In this control device, a short over-excitation is intermittently performed while maintaining the holding magnetization state of the line pressure solenoid. As the line pressure solenoid is not switched OFF, the solenoid remains in the ON state provided that the battery voltage does not drop. Even when the battery voltage falls and the line pressure solenoid switches OFF, it is restored to the ON state by subsequent over-excitation.

Further, as over-excitation and holding magnetization are repeatedly performed regardless of the driving of the cell motor, there is no need to provide means to detect battery voltage or means to detect cell motor drive.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

A first embodiment of the present invention will be described with reference to FIGS. 1–8.

Figure 1:
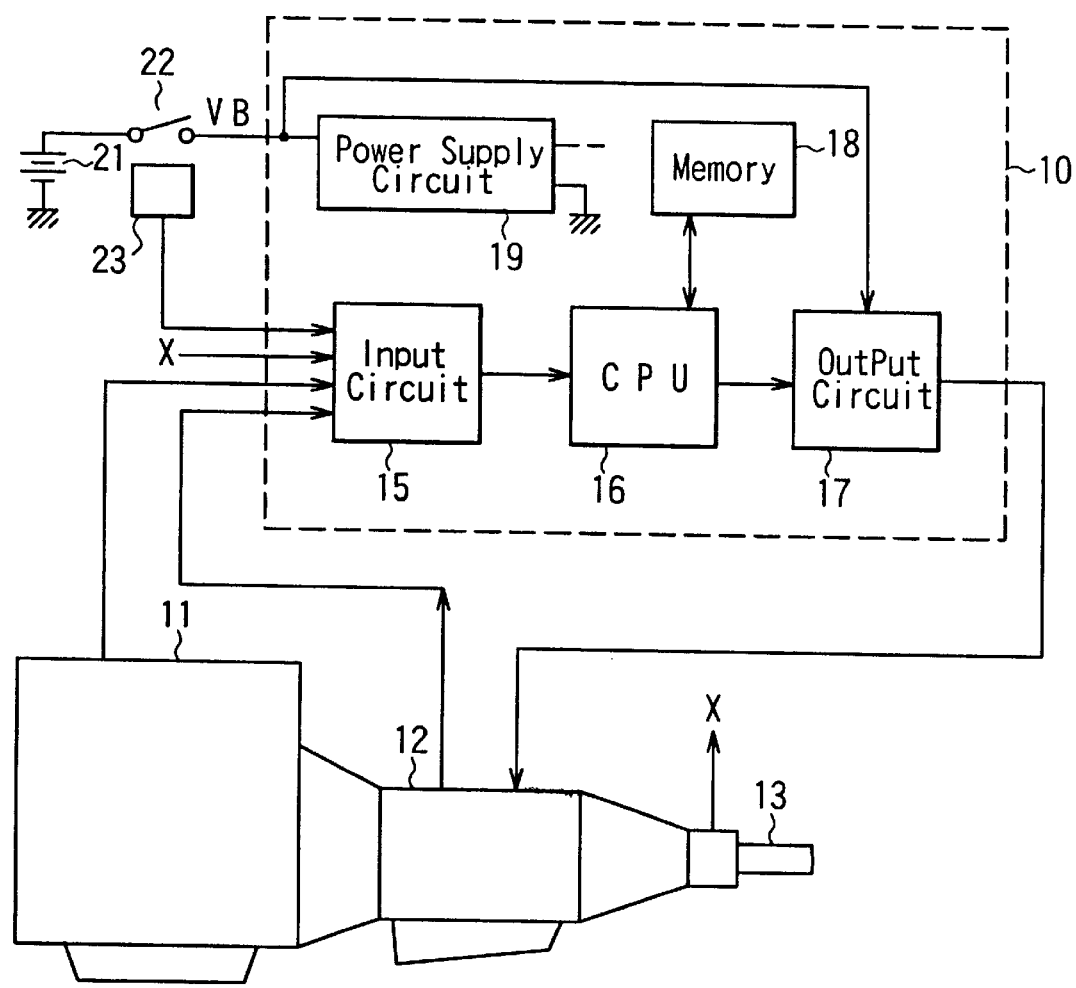
FIG. 1 is a view showing the construction and connection of a control device for an automatic transmission according to the present invention.

As shown in FIG. 1, an automatic transmission 12 changes the rotation speed of an output of an engine 11, and outputs the result to an output shaft 13. An automatic transmission control unit 10 receives a power supply from a battery 21 via a key switch 22 so as to control the automatic transmission 12. The key switch 22 is provided with a startup switch circuit, not shown, for the cell motor of the engine 11. The startup switch circuit is switched ON by setting the key to the cell motor drive position.

The automatic transmission control unit 10 comprises an input circuit 15, output circuit 17 and memory element 18 connected to a CPU (computing element) 16.

The input circuit 15 converts signal inputs from external sensors, switches and peripheral instruments into digital signals matched to the input requirements of the CPU 16. An analog voltage signal from the throttle sensor of the engine 11 and a frequency signals corresponding to the angular velocity of the engine 11 and the output shaft 13 are input to the input circuit 15.

The output circuit 17 generates output signals, corresponding to different loads, from various digital signals output by the CPU16.

The memory 18 controlled by the CPU16 retains programs and data processed by the CPU16.

A power supply circuit 19 generates a constant voltage for electronic circuits from the output voltage of the battery 21. The output circuit 17 operates a line pressure solenoid SL of the automatic transmission 12 using a battery voltage VB, as shown in FIG. 2.

Figure 2:
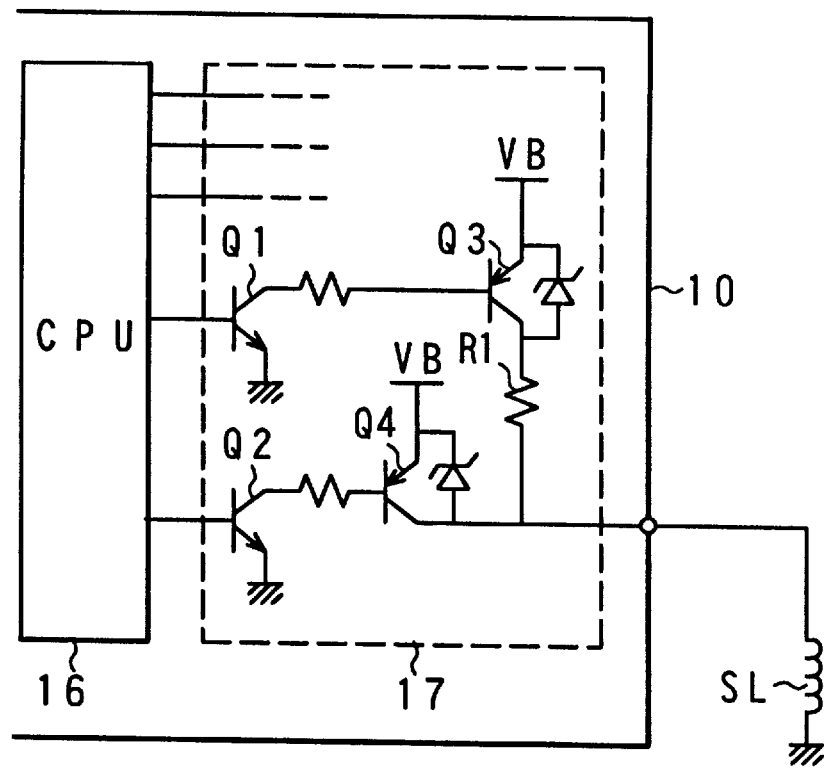
FIG. 2 is a view showing an output circuit in the control device.
Figure 3:
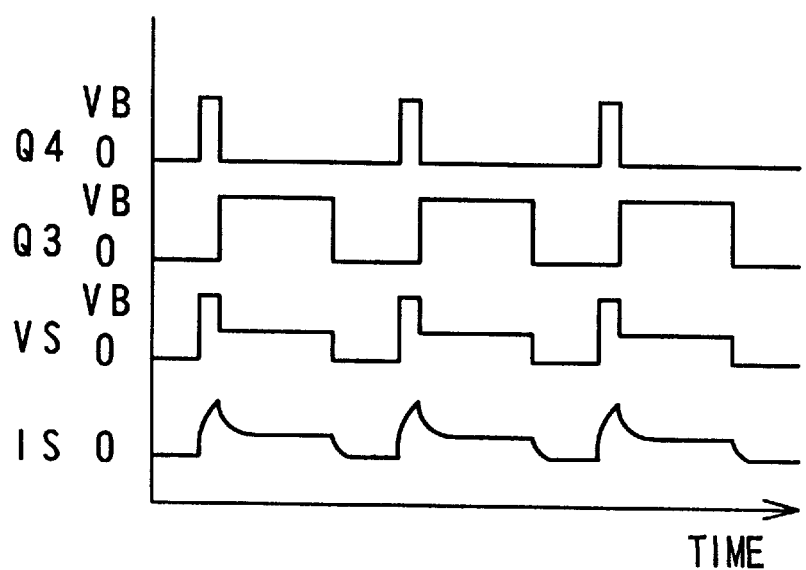
FIG. 3 is a time chart showing respective parameter characteristics in a control of a line pressure solenoid during a vehicle running condition.

As shown in FIG. 2, the CPU 16 repeats ON/OFF of transistors Q1, Q2 of the output circuit 17 with a fixed period, and the line pressure solenoid SL is duty ratio-controlled as shown in FIG. 3.

The signals denoted by Q3, Q4 in FIG. 3 represent the collector voltages of the transistors Q3, Q4, while VS, IS are the voltage applied to the terminals of the line pressure solenoid SL and the current flowing through the line pressure solenoid SL.

When the transistor Q2 is switched ON, the transistor Q4 also switches ON, the battery voltage VB is applied to the line pressure solenoid SL, and a large current flows so that the line pressure solenoid is over-excited. Next, when the transistor Q1 is switched ON, the transistor Q3 also switches ON, but the voltage applied to the line pressure solenoid SL drops to ⅓ of the battery voltage VB due to a voltage decrease of a drop resistance R1, and as a result the line pressure solenoid SL is placed in a holding magnetization.

The magnetic force of the over-excited coil compresses a return spring of the line pressure solenoid SL and attracts a plunger. The holding magnetization retains the attracted plunger against the counterforce of the return spring. If over-excitation of the line pressure solenoid SL is continued, a large current flows and the coil overheats. The holding magnetization is insufficient to compress the return spring and attract the plunger.

Under line pressure control during a running condition of the vehicle, control of the ON/OFF duty ratio of the line pressure solenoid SL is performed. The CPU 16 computes the throttle opening from the output of the throttle sensor of the engine 11, computes a vehicle speed from the angular velocity signal of the output shaft 13, and adjusts the duty ratio according to the throttle opening and vehicle speed.

The over-excitation, holding magnetization and OFF cycle is repeated at an interval of 20 msec (50 Hz) as shown in FIG. 3. In the case where over-excitation lasts for 3 msec, the proportion in which the remaining 17 msec is divided between holding magnetization and the OFF state is varied. When the duty ratio is 100% the line pressure is 0, and when the duty ratio is 15%, the line pressure equals to the original pressure of the oil pump.

The line pressure determines the engaging force of the engaging elements incorporated in the automatic transmission 12. When the output of the engine 11 rises (when the throttle opening increases), the CPU 16 increases the line pressure to ensure the required engaging force.

Figure 4:
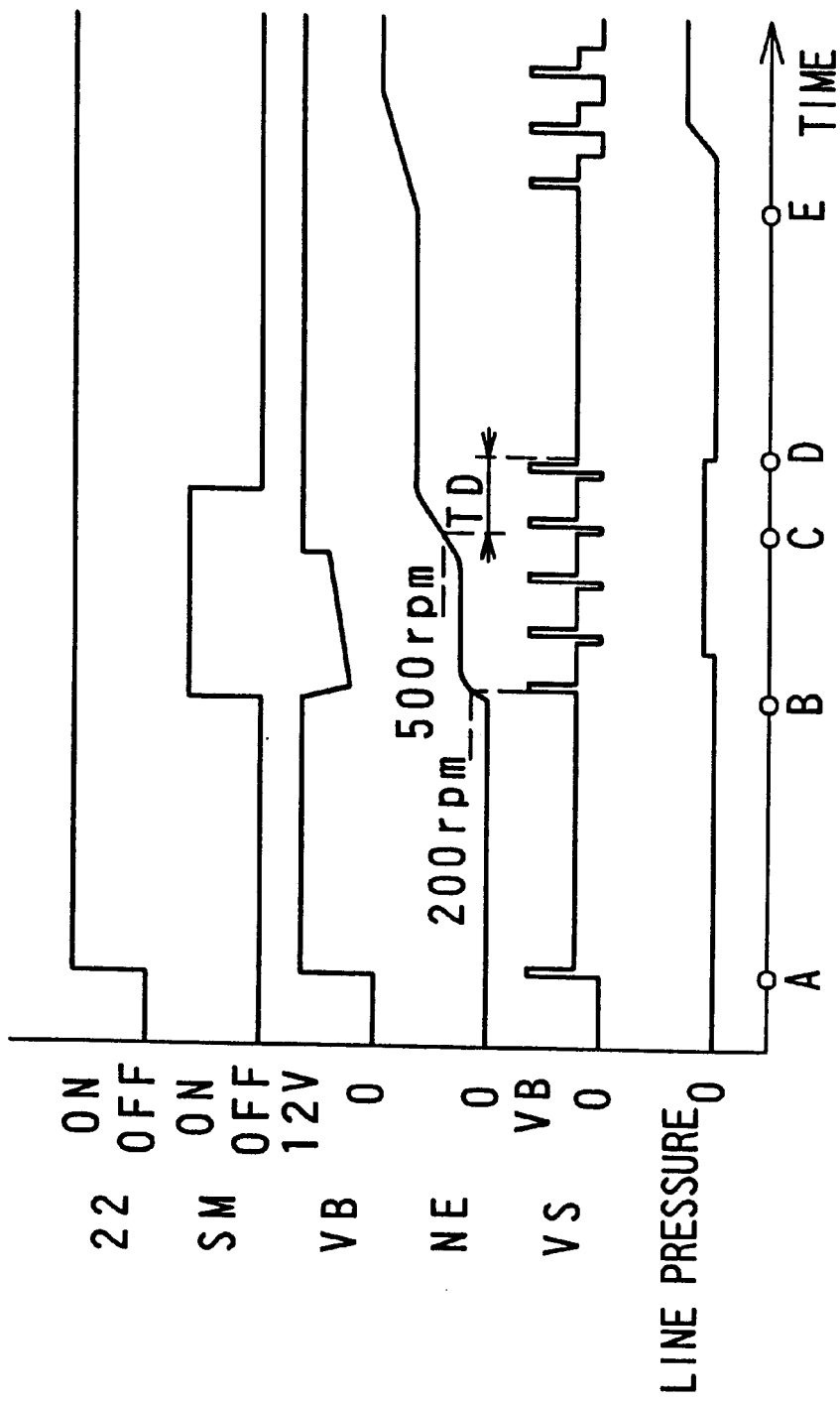
FIG. 4 is a time chart showing respective parameter characteristics during a stationary ON control of the line pressure solenoid.

FIG. 4 shows line pressure control when the vehicle is at rest. In the figure, the signal marked by the reference number 22 shows ON/OFF of the key switch 22, and the signal marked by the reference symbol SM shows ON/OFF of the cell motor of the engine 11 (key in/out of the cell motor drive position).

When the engine is stopped or is running idle, the CPU 16 puts the line pressure solenoid SL in a stationary ON state. This avoids the line pressure solenoid SL generating noise when the engine is quiet. For this purpose, immediately after the key switch 22 has been switched ON at a time A, the CPU 16 switches the transistor Q2 ON and the line pressure solenoid SL is over-excited for 3 msec, following which only the transistor Q1 remains ON so that the line pressure solenoid SL is holding magnetized. In this way, the line pressure solenoid SL is left ON while the line pressure is maintained at 0.

However at a time B, when the cell motor SM is switched ON and the battery voltage VB temporarily falls, the magnetic force of the holding magnetization decreases, and there is a possibility that the counterforce of the return spring of the line pressure solenoid SL may push the plunger back to the OFF state.

To overcome this problem, the CPU 16 detects an engine rotation speed NE, and when it is determined that the engine is rotating at a speed characteristic of cell motor operation, stationary ON control is stopped and control for running condition of the vehicle is applied. The line pressure solenoid SL is not a predominant noise source factor in the operating noise of the cell motor. Specifically, the line pressure solenoid SL repeats the over-excitation, holding magnetization and OFF cycle with a frequency of 50 Hz, and the ON/OFF duty ratio is set at a value depending on a throttle opening TVO.

When the cell motor SM is driving the engine 11, the engine rotation speed NE is approximately 300 rpm, but once the engine 11 starts and the engine rotation speed NE sharply rises, it exceeds 500 rpm at a time C, and then shifts to an idle rotation state at 600–1500 rpm.

Therefore, if it is determined that the engine 11 shifts to the idle rotation state by detection of the engine rotation speed NE, the CPU 16 recommences stationary ON control so that the noise of the line pressure solenoid SL is again suppressed. Subsequently, when stationary ON control is stopped at a time E due to the vehicle starting, etc., the control for running condition of the vehicle (ordinary control) is resumed.

However it may occur that even when the engine rotation speed NE sharply rises, the output of the battery 21 does not return to the normal 12V at the time C above 500 rpm. The CPU 16 therefore continues control for running condition of the vehicle even when the engine rotation speed NE exceeds 500 rpm, and recommences stationary ON control at a time D after a time TD (1 second) has elapsed.

The control of the first embodiment will now be described referring to FIG. 5 and FIG. 6.

In step 101, it is determined whether or not the automatic transmission is in a gear change operation. If the gear change operation is proceeding, step 108 is executed to apply line pressure control characteristic of gear change operation. The line pressure is finely set at each stage from the start to the end of gear change operation.

In a following step 109, the line pressure solenoid SL is duty ratio-controlled so as to obtain a predetermined line pressure pattern. The gear change shock accompanying change-over of engaging elements of the automatic transmission 12 is thereby effectively suppressed.

When the automatic transmission is not in the gear change operation, the step 102 and subsequent steps are performed, and the aforesaid control for running condition of the vehicle (ordinary control) or stationary ON control is applied.

In step 102, the throttle opening TVO is computed from the output of the throttle sensor of the engine 11.

Figure 7:
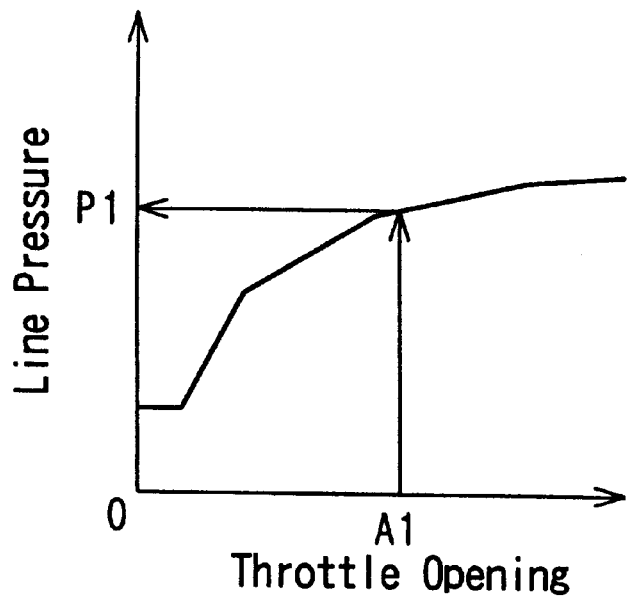
FIG. 7 is a graph showing a relation between throttle opening and line pressure setting.

In step 103, a comparison table between the throttle opening and line pressure shown in FIG. 7 is called from the memory 18, and a line pressure P1 corresponding to a throttle opening A1 at this time is calculated.

Figure 8:
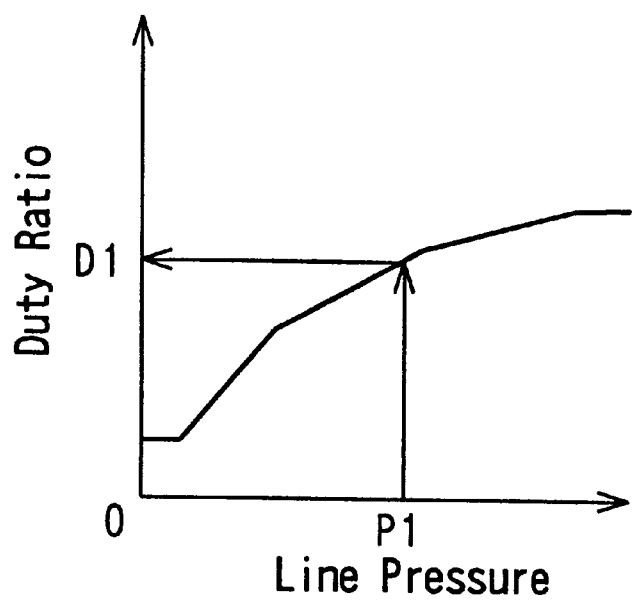
FIG. 8 is a graph showing a relation between line pressure setting and duty ratio.

In step 104, a comparison table between the line pressure and duty ratio shown in FIG. 8 is read from the memory 18, and a duty ratio D1 corresponding to the line pressure P1 found in the step 103 is calculated.

Figure 6:
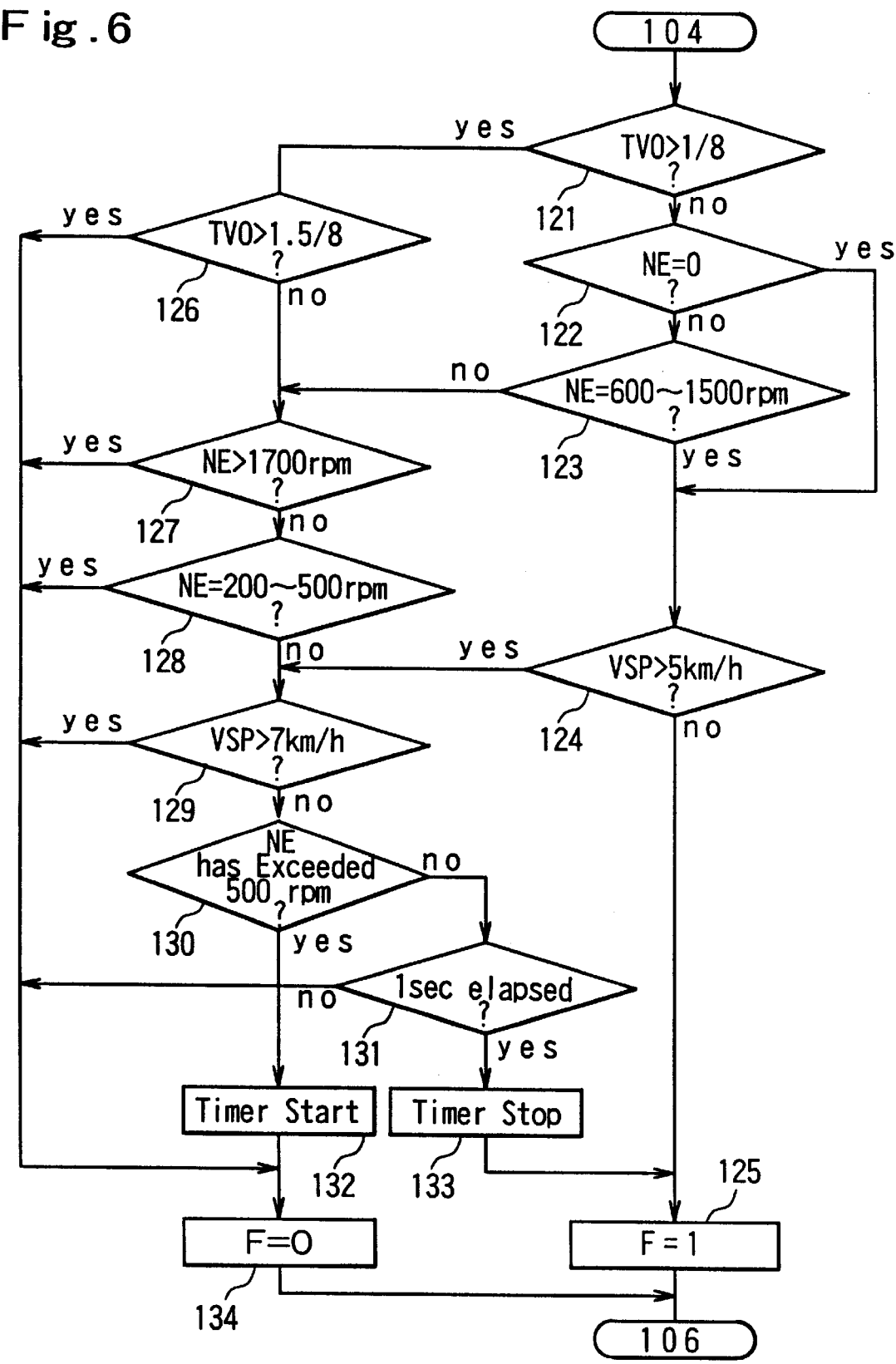
FIG. 6 is a flowchart showing a detailed flow of the control of the line pressure solenoid according to a first embodiment.

In step 105, it is determined whether to apply stationary ON control or ordinary control according to a flowchart in FIG. 6. When stationary ON control is to be applied, a flag F is set to 1, and when ordinary control is to be applied, the flag F is set to 0.

In step 106, it is determined whether the flag F is 1 or 0. When the flag F is 1, the routine proceeds to step 107 to perform the stationary ON control shown in FIG. 4, otherwise when the flag F is 0, the routine proceeds to step 109 to perform the control for running condition of the vehicle (ordinary control) shown in FIG. 3.

In step 110, controls other than line pressure control (gear change determination, change-over of engaging elements accompanying gear change, lockup determination, lockup control, etc.) are performed.

In step 121, it is determined whether or not the throttle opening TVO exceeds ⅛. When the throttle opening TVO exceeds ⅛ the routine proceeds to step 126, and when the throttle opening TVO is equal to or less than ⅛, step 122 is executed to determine whether or not the engine rotation speed NE is 0. When the engine rotation speed NE is not 0, the routine proceeds to step 123 where it is determined whether or not the engine rotation speed NE lies within the range 600–1500 rpm.

When the engine rotation speed NE does not lie within the range 600–1500 rpm, the routine proceeds from step 123 to step 127. When the engine is stopped (NE=0) or the engine is in the idle running state (600–1500 rpm), step 124 is executed to determine whether or not the vehicle speed VSP exceeds 5 km/h. When the vehicle is in a stop state (VSP is equal to 5 km/h or less), the routine proceeds to step 125 and the flag F is set to 1. When the vehicle speed VSP exceeds 5 km/h, the routine proceeds to step 129.

In step 126, it is determined whether or not the throttle opening TVO exceeds 1·5/8. If it is equal to or less than 1·5/8, step 127 is executed to determine whether or not the engine rotation speed NE exceeds 1700 rpm. When the engine rotation speed NE is equal to or less than 1700 rpm, the routine proceeds to step 128 where it is determined whether or not the engine rotation speed NE lies within the range 200–500 rpm. When the engine rotation speed NE does not lie within the range 200–500 rpm, the routine proceeds to step 129 where it is determined whether or not the vehicle speed VSP is less than 7 km/h. When the vehicle speed VSP is less than 7 km/h, the routine proceeds to step 130.

On the other hand when the accelerator pedal is depressed (TVO is equal to or greater than 1·5/8), the idle rotation state has passed and the vehicle is starting (NE is equal to or greater than 1700 rpm), the engine is running idle (NE lies within the range 200–500 rpm), or the vehicle is actually in running condition (vehicle speed VSP is equal to or higher than 7 km/h), the routine proceeds to step 134 and the flag F is set to 0.

In the step 130, an increase of the engine rotation speed NE due to startup of the engine 11 is detected. The present engine rotation speed NE is compared on the immediately preceding rotation speed. When the rotation speed exceeds 500 rpm first time, step 132 is executed to reset a timer, and to start a time count. After the engine rotation speed NE reached or exceeded 500 rpm, the routine proceeds to step 131, where it is checked whether or not the time count has reached 1 second. If the time count reaches 1 second then the time count is stopped in step 133 and the routine of FIG. 6 is terminated while the flag F is maintained in its present state. On the other hand, until the time count reaches 1 second, the routine proceeds to step 134 and the flag is set to 0.

Figure 5:
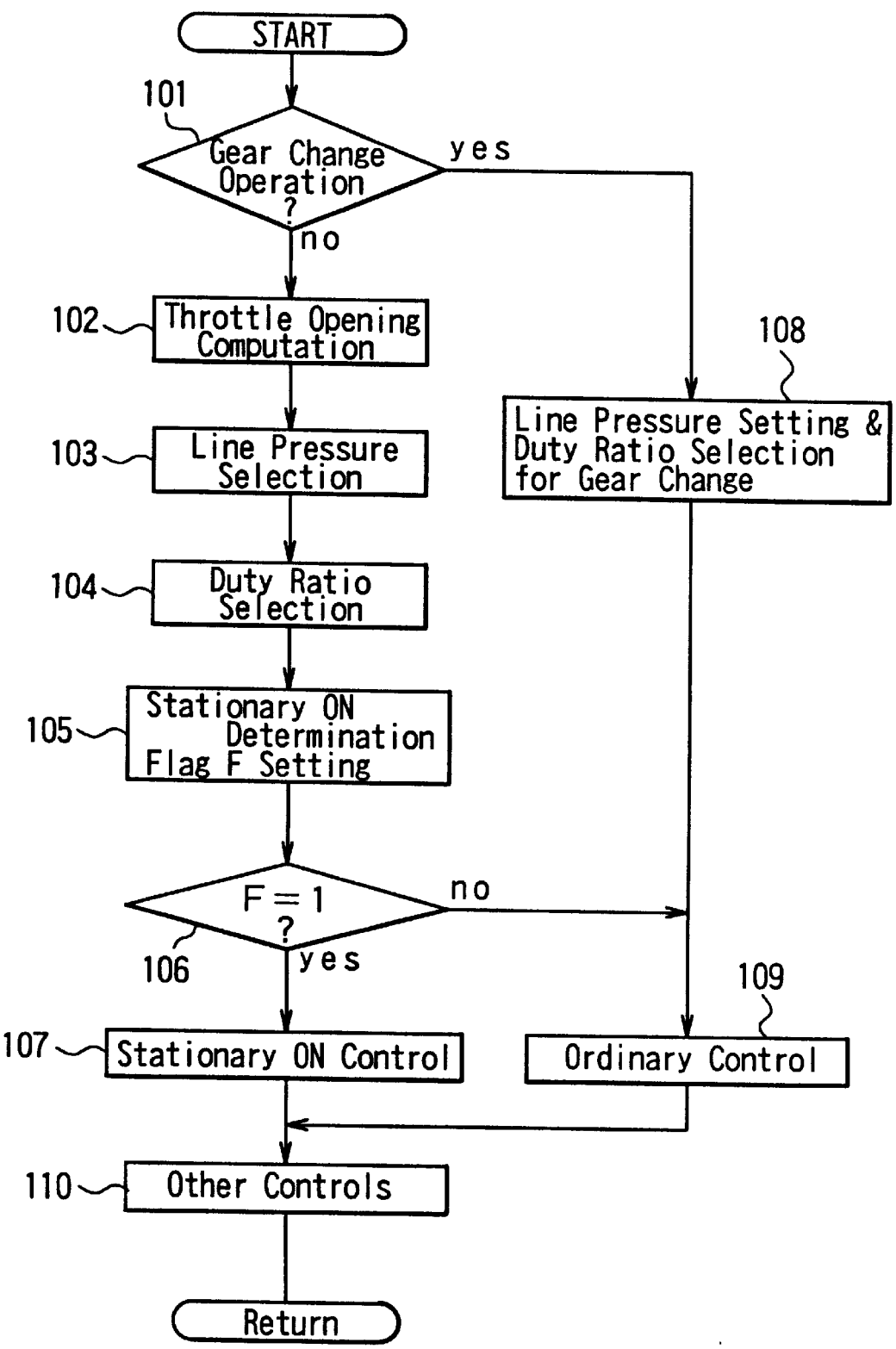
FIG. 5 is a flowchart showing a flow of the control of the automatic transmission.

In the flowcharts shown in FIG. 5 and FIG. 6, the steps 121, 122, 124, 125, 106, 107 correspond to the stationary ON control means. The steps 123, 127, 128 correspond to the engine rotation speed detecting means, and the steps 134, 106, 109 correspond to the recovery means.

Due to the control unit 10 of the automatic transmission according to the first embodiment, the line pressure solenoid SL is subject to stationary ON state control when the engine has stopped or is running idle, hence the plunger of the line pressure solenoid SL does not vibrate or generate noise as in the case of ordinary control.

Even when the battery voltage VB drops due to cell motor drive, and the return spring of the line pressure solenoid SL pushes the plunger back so as to temporarily return to the OFF state, ordinary control is applied, and thus the ON state is immediately restored by over-excitation, and increase of line pressure is avoided. There is therefore no risk that the driver will experience discomfort due to the vehicle starting at an abnormally high line pressure.

Further, since the engine rotation speed NE used to control the automatic transmission 12 is checked so as to determine the start and end of stationary ON control of the line pressure solenoid SL, hence there is no need for a circuit to detect the battery voltage VB and no need for new wiring or input/output terminals.

No special control is added to intermittently perform over-excitation, and as the control for running condition of the vehicle is used, this control mode can be realized by making only a slight modification to a conventional processing program.

Further, as stationary ON control is started after waiting for 1 second after the engine 11 starts and the engine rotation speed NE increases even when the speed exceeds 500 rpm, the line pressure solenoid may be maintained without fail in the ON state by over-excitation after the battery voltage VB has recovered, as shown in FIG. 4.

According to the first embodiment, control is switched from stationary ON control to ordinary control when the engine rotation speed NE exceeds 0, and stationary ON control is restored from ordinary control after the speed exceeds 500 rpm and 1 second has elapsed. However alternatively, the holding magnetization of the first stationary ON control may be continued after the speed exceeds 500 rpm until 1 second has elapsed, and one or more over-excitations performed after 1 second has elapsed so as to restore to holding magnetization.

Figure 9:
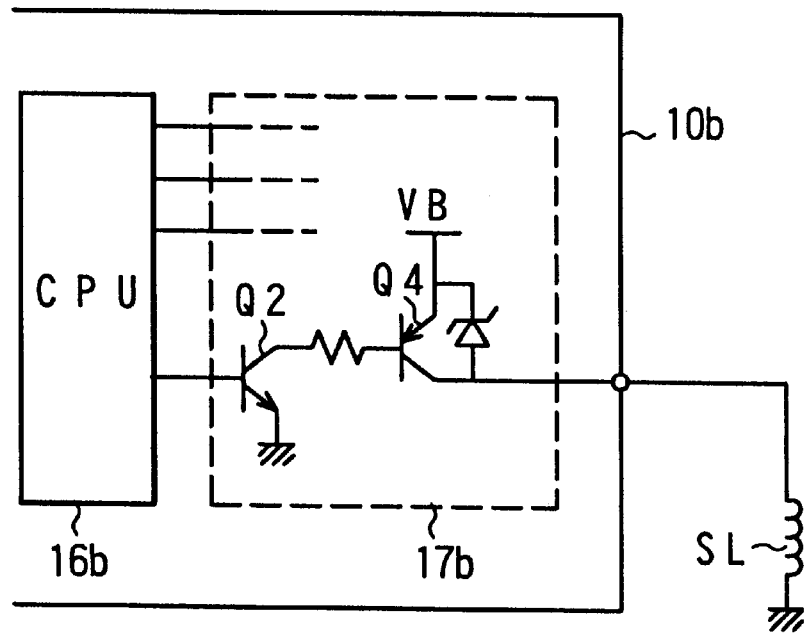
FIG. 9 is a view showing another output circuit.
Figure 10:
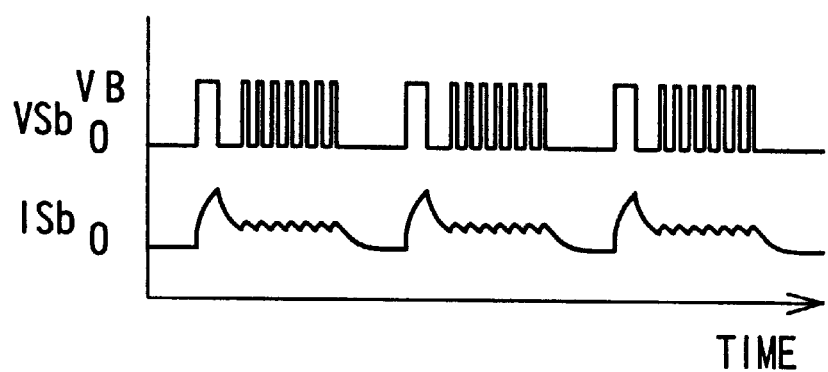
FIG. 10 is a time chart showing another form of control of the line pressure solenoid during a vehicle running condition.

Further, according to the first embodiment, the over-excitation and holding magnetization of the line pressure solenoid SL are set using the two transistors Q3, Q4 and the drop resistor R1, however over-excitation and holding magnetization may also be obtained by performing switching control of only the transistor Q4 shown in FIG. 9 and FIG. 10.

A CPU 16b provided in a control unit 10b of the automatic transmission rapidly switches the transistor Q4 ON/OFF via the transistor Q2 of an output circuit 17b, as shown in FIG. 9, and a voltage VSb is supplied to the line pressure solenoid SL as shown in FIG. 10. Since the current variation is then supressed by the nature of the coil, a current ISb flows which produces over-excitation and holding magnetization which is similar to the current IS shown in FIG. 3.

A second embodiment of the invention will now be described with reference to FIG. 11. According to the second embodiment, in conjunction with the key switch 22 of the first embodiment, a sensor 23 (switch) is provided which detects whether or not the key is set to the cell motor drive position. The output of this sensor 23 is input to the CPU 16 via an input circuit 15. Also regarding the step 105 shown in FIG. 5, the processing shown in FIG. 6 is replaced by the processing shown in FIG. 11. A description of construction and control features which are common to those of the first embodiment will be omitted, and the processing shown in FIG. 11 will be described.

In step 221, it is determined whether or not the throttle opening TVO exceeds 1/8. When it exceeds 1/8 the routine proceeds to step 225, conversely when it is equal to or less than 1/8, the routine proceeds to step 222 where it is determined whether or not the engine rotation speed NE is 0 rpm. When the engine rotation speed NE exceeds 0 rpm, the routine proceeds to step 226, and when the engine rotation speed NE is 0 rpm, the routine proceeds to step 223 where it is determined whether the vehicle speed VSP exceeds 5 km/h. When the vehicle speed VSP exceeds 5 km/h, the routine proceeds to step 227.

When the accelerator pedal is not depressed (TVO is equal to or less than 1/8), the engine has stopped (NE=0) and the vehicle has stopped (VSP is equal to or less than 5 km/h), then the routine proceeds to step 224 and the flag F is set to 1. In other words, the stationary ON state is selected, and after the line pressure solenoid SL has been over-excited once, its holding magnetization state is maintained.

In step 225, it is determined whether or not the throttle opening TVO exceeds 1·5/8. When it is equal to or less than 1·⁵⁄₈, the routine proceeds to step 226 where it is determined whether or not the engine rotation speed NE exceeds 1700 rpm. When the engine rotation speed NE is equal to or less than 1700 rpm, the routine proceeds to the step 227 where it is determined whether or not the vehicle speed exceeds 7 km/h. When the vehicle speed is equal to or less than 7 km/h, the routine proceeds to step 228.

When the accelerator pedal is depressed (TVO exceeds 1·⁵⁄₈), the idle rotation state has passed and the vehicle is starting (NE exceeds 1700 rpm) or the vehicle is in running condition (vehicle speed VSP exceeds 7 km/h), the routine proceeds to step 232 and the flag F is set to 0. In other words, ordinary control is selected, and the line pressure solenoid SL is duty ratio-controlled as shown in FIG. 3.

In step 228, it is determined whether or not the key switch 22 is in the cell motor drive position. When it is in the cell motor drive position, the routine proceeds to the step 232 and the flag F is set to 0. When it is not in the cell motor drive position, the flag F is maintained in its present state and the routine is terminated.

Figure 11:
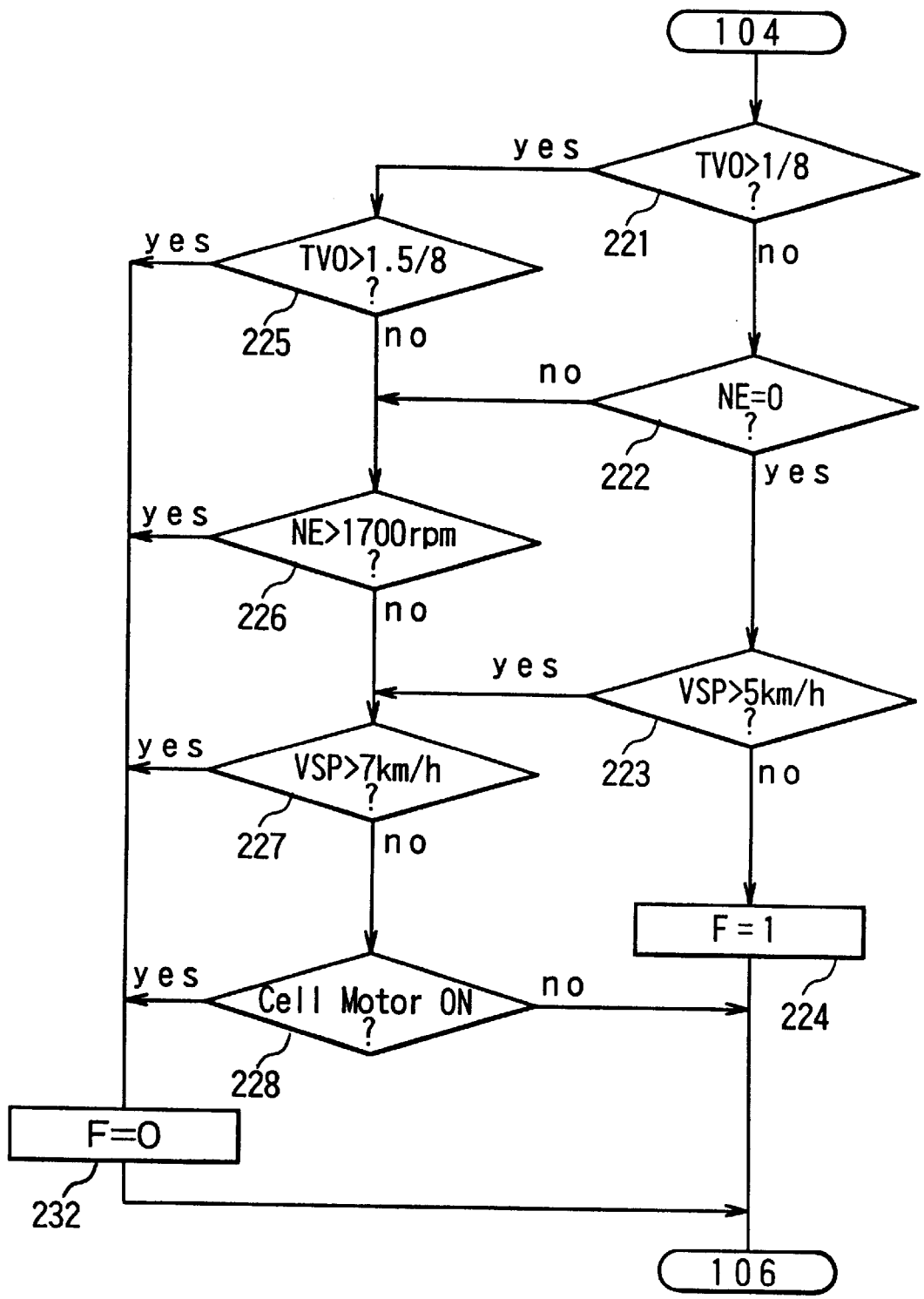
FIG. 11 is a flowchart showing a detailed flow of control of the line pressure solenoid according to a second embodiment.

In the flowcharts of FIG. 5 and FIG. 11, the steps 221, 222, 223, 224, 106, 107 correspond to the stationary ON control means. The step 228 corresponds to a cell motor ON detecting means, and the steps 232, 106, 109 correspond to the recovery means.

In the control according to the second embodiment, the line pressure solenoid SL is stationary ON-controlled when the engine is in a stop state, so the noise such as that emitted by the line pressure solenoid SL in ordinary control is not generated.

After the cell motor is driven, ordinary control is applied, so a situation where the line pressure solenoid SL remains in the OFF state due to holding magnetization, as in the case where the battery voltage VB falls during stationary ON control, is avoided.

Figure 12:
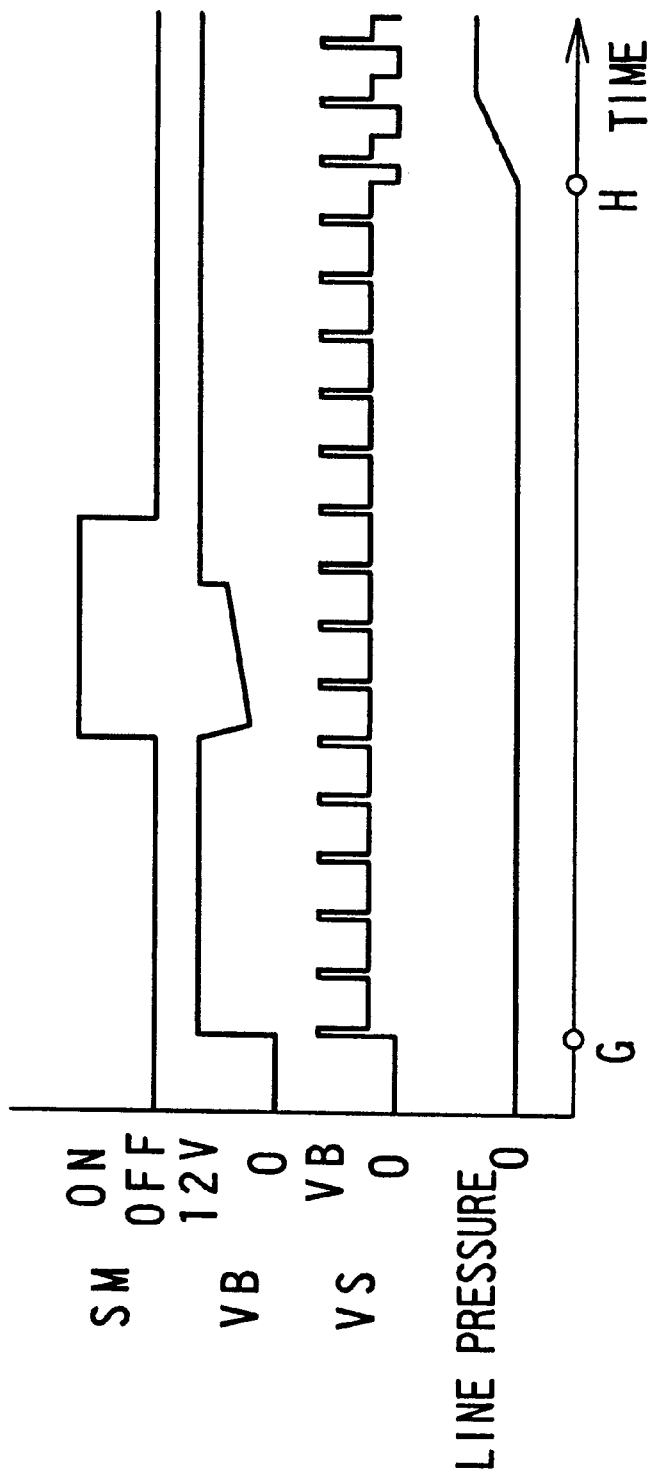
FIG. 12 is a time chart showing a control for maintaining the line pressure solenoid in an ON state.
Figure 13:
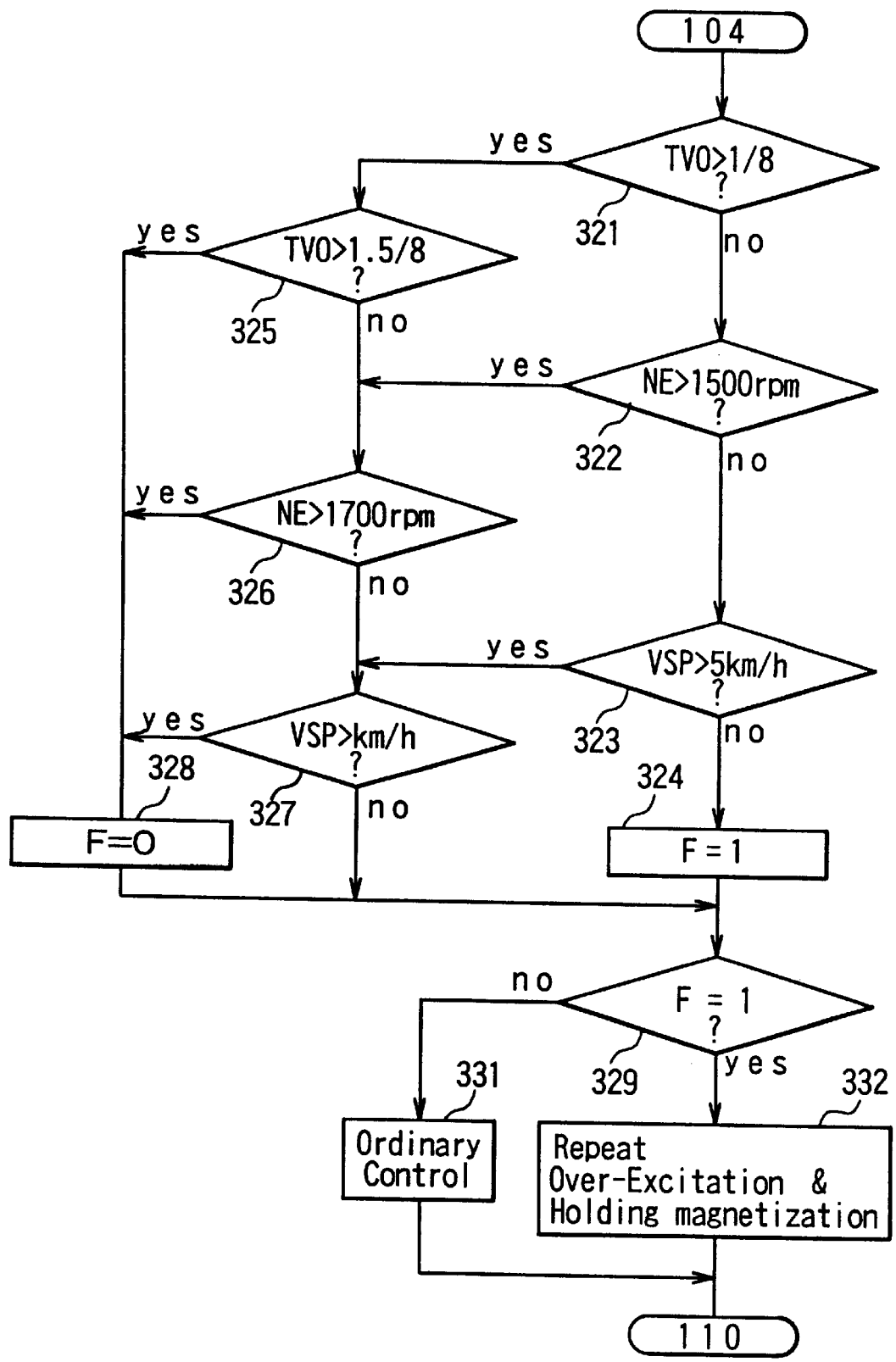
FIG. 13 is a flowchart showing a detailed flow of control of the line pressure solenoid according to a third embodiment.

FIG. 12 and FIG. 13 show a third embodiment of this invention. Herein, in the control of the first embodiment shown in FIG. 5, the processing of the steps 105, 106, 107, 109 is replaced by the processing shown in FIG. 13. A description of the construction and control features which are common to those of the first embodiment will be omitted.

According to the third embodiment, when the key switch 22 is switched ON at a time G, over-excitation for 3 msec and holding magnetization for 17 msec of the line pressure solenoid SL are repeated so as to switch the line pressure solenoid SL ON. This special ON state is continued provided that the accelerator pedal is not depressed (TVO is equal to or less than ⅛), and provided that the vehicle is in a stop state (VSP is equal to or less than 5 km/h). Then, at a time H when the idle running state is over and the engine 11 comes in starting condition (NE exceeds 1700 rpm), ordinary control starts.

As this special ON state does not include the OFF of the line pressure solenoid SL, the plunger does not vibrate as it does under ordinary control, and the line pressure solenoid SL remains ON. Even when the battery voltage VB drops due to cell motor operation and the line pressure solenoid SL switches OFF without the intention of the driver, it rapidly recovers due to subsequent over-excitation.

In step 321, it is determined whether or not the throttle opening TVO exceeds ⅛. When it exceeds ⅛, the routine proceeds to step 325, and when it is equal to or less than ⅛, the routine proceeds to step 322 where it is determined whether or not the engine rotation speed NE exceeds 1500 rpm. When the engine rotation speed NE exceeds 1500 rpm, the routine proceeds to step 326, and when the engine rotation speed NE is equal to or less than 1500 rpm, the routine proceeds to step 323 where it is determined whether or not the vehicle speed VSP exceeds 5 km/h. When the vehicle speed exceeds 5 km/h, the routine proceeds to step 327.

When the throttle opening TVO is equal to or less than ⅛, the engine rotation speed NE is equal to or less than 1500 rpm and the vehicle speed VSP is equal to or less than 5 km/h, the routine proceeds to step 324 where the flag F is set to 1.

In the step 325, it is determined whether or not the throttle opening TVO exceeds 1·⁵⁄₈. When it is equal to or less than 1·⁵⁄₈, the routine proceeds to the step 326 where it is determined whether or not the engine rotation speed NE exceeds 1700 rpm. When the engine rotation speed NE is equal to or less than 1700 rpm, the routine proceeds to the step 327 where it is determined whether or not the vehicle speed VSP exceeds 7 km/h. When the vehicle speed VSP is equal to or less than 7 km/h, the routine is terminated while the flag F is maintained in its present state.

When the throttle opening TVO exceeds 1·⁵⁄₈, the engine rotation speed NE exceeds 1700 rpm or the vehicle speed exceeds 7 km/h, the routine proceeds to step 328 and the flag F is set to 0.

In step 329, it is determined whether the flag F is 1 or 0. If the flag F is 0, step 331 is executed to perform ordinary control. In ordinary control, the line pressure solenoid SL is duty ratio-controlled as shown in FIG. 3.

On the other hand, If the flag F is 1, step 332 is executed to perform the aforesaid special ON state control. The line pressure solenoid SL is driven at 50 Hz in the same way as in ordinary control as shown in FIG. 12, but over-excitation for 3 msec and holding magnetization for 17 msec are alternately performed without any OFF period between them.

According to the control of the third embodiment, after the key switch is switched ON, the line pressure solenoid SL is maintained in the ON state until the vehicle starts, so the line pressure solenoid SL does not generate any noise as in ordinary control.

What is claimed:

1. A control device for an automatic transmission, wherein a line pressure solenoid of an automatic transmission is held in a stationary ON state when an engine is in a stop state, and comprising;

stationary ON control means for maintaining a holding magnetization state of said line pressure solenoid after performing over-excitation when an engine stop state is detected;

engine rotation speed detecting means for detecting that the engine rotation speed is within a range corresponding to the driving of a cell motor; and recovery means for performing over-excitation of said line pressure solenoid one or more times after the drive of said cell motor has been detected.

2. A control device for an automatic transmission, wherein a line pressure solenoid of an automatic transmission is held in a stationary ON state when an engine is in a stop state, and comprising;

stationary ON control means for maintaining a holding magnetization state of said line pressure solenoid after performing over-excitation when an engine stop state is detected;

cell motor ON detecting means for detecting that a key switch is in a cell motor drive position; and recovery means for performing over-excitation of said line pressure solenoid one or more times after the drive of said cell motor has been detected.

3. A control device for an automatic transmission as defined in claim 1, wherein said recovery means continues intermittent over-excitation until a predetermined time has elapsed after the detected cell motor drive has ceased.

4. A control device for an automatic transmission, wherein a line pressure solenoid of an automatic transmission is held in a stationary ON state when an engine is in a stop state, and
wherein a holding magnetization state of said line pressure solenoid is maintained together with intermittent over-excitation when an engine stop state is detected until a vehicle has reached a starting state.

5. A control device for an automatic transmission comprising a control unit having a CPU and connected to an engine for inputting an engine rotation speed signal, wherein said CPU outputs a signal to hold a line pressure solenoid of the automatic transmission in a stationary ON state by maintaining a holding magnetization state of said line pressure solenoid after performing over-excitation when detected an engine stop state, and outputs a signal to perform over-excitation of said line pressure solenoid one or more times when detected that the engine rotation speed within a range corresponding to the driving of a cell motor.

6. A control device for an automatic transmission comprising a control unit having a CPU and connected to an engine for inputting an engine rotation speed signal and to a sensor for detecting a key switch position, wherein said CPU outputs a signal to hold a line pressure solenoid of the automatic transmission in a stationary ON state by maintaining a holding magnetization state of said line pressure solenoid after performing over-excitation when detected an engine stop state, and outputs a signal to perform over-excitation of said line pressure solenoid one or more times when detected that said key switch is in a cell motor drive position.

7. A control device for an automatic transmission as defined in claim 5, wherein said CPU outputs a signal to continue intermittent over-excitation until a predetermined time has elapsed after said key switch is moved out of the cell motor drive position.

8. A control device for an automatic transmission comprising a control unit having a CPU and connected to an engine for inputting an engine rotation speed signal, wherein said CPU outputs a signal to hold a line pressure solenoid of the automatic transmission in a stationary ON state by maintaining a holding magnetization state of said line pressure solenoid together with intermittent over-excitation until a vehicle has reached a starting state when detected an engine stop state.

9. A control device for an automatic transmission as defined in claim 2, wherein said recovery means continues intermittent over-excitation until a predetermined time has elapsed after the detected cell motor drive has ceased.

10. A control device for an automatic transmission as defined in claim 6, wherein said CPU outputs a signal to continue intermittent over-excitation until a predetermined time has elapsed after said key switch is moved out of the cell motor drive position.

* * * * *